US010344180B2

(12) United States Patent
Koger et al.

(10) Patent No.: US 10,344,180 B2
(45) Date of Patent: Jul. 9, 2019

(54) WATER BASED PRINTABLE COATINGS

(71) Applicants: Linwood G. Koger, Santa Anna, CA (US); Frank Y. Shih, Arcadia, CA (US)

(72) Inventors: Linwood G. Koger, Santa Anna, CA (US); Frank Y. Shih, Arcadia, CA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 15/687,652

(22) Filed: Aug. 28, 2017

(65) Prior Publication Data

US 2018/0320018 A1 Nov. 8, 2018

Related U.S. Application Data

(63) Continuation of application No. 14/568,638, filed on Dec. 12, 2014, now Pat. No. 9,777,191.

(60) Provisional application No. 61/915,696, filed on Dec. 13, 2013.

(51) Int. Cl.
C08G 63/02 (2006.01)
C09D 175/04 (2006.01)
C09D 5/00 (2006.01)
C08J 3/24 (2006.01)
C08K 3/36 (2006.01)
C08L 33/00 (2006.01)
C08L 67/02 (2006.01)

(52) U.S. Cl.
CPC ............ C09D 175/04 (2013.01); C09D 5/00 (2013.01); C08J 3/24 (2013.01); C08K 3/36 (2013.01); C08L 33/00 (2013.01); C08L 67/02 (2013.01); Y10T 428/31551 (2015.04); Y10T 428/31565 (2015.04); Y10T 428/31587 (2015.04)

(58) Field of Classification Search
USPC ........................ 428/423.1, 424.8, 454, 480
See application file for complete search history.

(56) References Cited

U.S. PATENT DOCUMENTS

| 5,556,912 | A | 9/1996 | Brock et al. |
|---|---|---|---|
| 5,652,300 | A | 7/1997 | Morikawa et al. |
| 6,017,998 | A | 1/2000 | Duan et al. |
| 6,060,157 | A | 5/2000 | LaPerre et al. |
| 6,797,764 | B2 | 9/2004 | Sagiv et al. |
| 6,881,458 | B2 | 4/2005 | Ludwig et al. |
| 7,199,182 | B2 | 4/2007 | Tanaka et al. |
| 7,902,302 | B2 | 3/2011 | Blum et al. |
| 8,022,138 | B2 | 9/2011 | Argyropoulos et al. |
| 2004/0086307 | A1 | 5/2004 | Murai et al. |
| 2006/0210768 | A1 | 9/2006 | Masuda |
| 2009/0269592 | A1 | 10/2009 | Hakamata et al. |
| 2010/0035026 | A1 | 2/2010 | Oscar et al. |
| 2010/0119775 | A1 | 5/2010 | Bustos et al. |
| 2012/0315485 | A1 | 12/2012 | Iwazumi et al. |
| 2014/0066569 | A1 | 3/2014 | Schrinner et al. |

FOREIGN PATENT DOCUMENTS

| CN | 101787242 | 4/2013 |
|---|---|---|
| WO | 03/049942 | 6/2003 |
| WO | 03/087241 | 10/2003 |
| WO | 03/093357 | 11/2003 |
| WO | 2010/091346 | 8/2010 |

OTHER PUBLICATIONS

International Search Report and Written Opinion dated Mar. 17, 2015 issued in corresponding International Application No. PCT/US2014/069953 filed Dec. 12, 2014.
International Preliminary Report on Patentability dated Jun. 23, 2016 issued in corresponding International Application No. PCT/US2014/069953 filed Dec. 12, 2014.

Primary Examiner — Terressa Boykin
(74) Attorney, Agent, or Firm — Avery Dennison Corporation

(57) ABSTRACT

Various aqueous top coat compositions are described. The compositions include one or more polyurethane dispersions, silica, crosslinker(s), acrylic polymers, and an optional water soluble polyester. The compositions can be used to form top coats which exhibit good resistance to scratches and solvents, and improved ink retention.

20 Claims, No Drawings

WATER BASED PRINTABLE COATINGS

CROSS REFERENCES TO RELATED APPLICATIONS

The present application is a continuation of U.S. application Ser. No. 14/568,638 filed Dec. 12, 2014, now U.S. Pat. No. 9,777,191, which claims the benefit of U.S. Provisional Application No. 61/915,696 filed Dec. 13, 2013, both of which are incorporated herein by reference in their entireties.

BACKGROUND

The present subject matter relates to water based compositions. The compositions are well suited for coatings that can be applied to a variety of substrates for improving adhesion of inks and other printable compositions. In particular, the present subject matter relates to top coat compositions.

Coating compositions are known for applying to paper and polymeric films to provide or impart certain characteristics to the coated substrate. For example, top coats are known for providing a glossy surface or for providing a particular appearance.

In many applications, films or other thin substrates are coated to improve adherence of printing media or inks. Improved adherence of print or deposited inks may also be indicated by increased resistance to abrasion, solvents, and/or environmental factors.

Although top coats having excellent performance with regard to one or several performance aspects are known, a need remains for top coats having a relatively wide range of performance characteristics.

SUMMARY

The difficulties and drawbacks associated with previously known coating compositions are addressed by the present subject matter top coat compositions and coated substrates.

In one aspect, the present subject matter provides an aqueous top coat composition comprising 10 to 85 parts of one or more polyurethanes, 10 to 60 parts of one or more water soluble polyesters, 0 to 80 parts of acrylic polymer, and 0.01 to 3 parts of silica and 0.05 to 3 parts crosslinker.

In another aspect, the present subject matter provides a top coated substrate comprising a polymeric substrate and an aqueous top coat composition disposed on the substrate. The top coat composition includes 10 to 85 parts of one or more polyurethanes, 10 to 60 parts of one or more water soluble polyesters, 0 to 80 parts of acrylic, and 0.01 to 3 parts of silica, and 0.05 to 3 parts crosslinker.

As will be realized, the subject matter described herein is capable of other and different embodiments and its several details are capable of modifications in various respects, all without departing from the claimed subject matter. Accordingly, the description is to be regarded as illustrative and not restrictive.

DETAILED DESCRIPTION OF THE EMBODIMENTS

The present subject matter provides various compositions particularly adapted for applying to substrates such as polymeric films to improve printing characteristics and ink adherence properties. In particular embodiments, the compositions can be used as top coat compositions for polymeric films such as polyester films, polypropylene films, and particularly for bi-axially oriented polypropylene (BOPP) films. The present subject matter compositions are also well suited for use as top coat compositions for machine direction orientation (MDO) polymeric films.

The compositions of the present subject matter generally comprise an aqueous blend or combination of (i) one or more polyurethane dispersions to provide an effective amount of polyurethane solids, (ii) one or more optional water soluble polyesters, (iii) one or more optional acrylic polymer, (iv) silica, and (v) one or more crosslinkers or crosslinking agent(s). The compositions comprise components (i)-(v) mixed, blended, or otherwise incorporated in an aqueous vehicle.

Table 1 set forth below presents typical and particular weight proportions of components (i)-(v) in the present subject matter compositions. The values in Table 1 are weight parts or dry parts by weight. In use, the components are combined with water in desired amounts or incorporated in an aqueous vehicle to form a wide array of compositions such as for example top coat formulations.

TABLE 1

Top Coat Compositions

| Components | Typical Range of Weight Proportions | Particular Range of Weight Proportions |
| --- | --- | --- |
| Polyurethane Dispersion (solids) | 10-85 | 15-80 |
| Water Soluble Polyester (solids) | 10-60 | 15-25 |
| Silica | 0.01-3 | 0.01-2 |
| Acrylic (solids) | 0-80 | 10-70 |
| Crosslinker | 0.05-3 | 0.10-1 |
| Water | — | — |

In particular embodiments, the polyurethane solids are provided via at least two components, a dispersion of a "hard" polyurethane component and a dispersion of a "soft" polyurethane component. An example of a hard polyurethane component suitable for use in a top coat composition of the present subject matter is BAYHYDROL® UH XP 2719 available from Bayer Material Science. BAYHYDROL® UH XP 2719 is an aliphatic, polyester-based anionic polyurethane dispersion. An example of a soft polyurethane component suitable for use in a top coat composition of the present subject matter is NEOREZ™ R-9621 available from DSM NeoResins. NEOREZ™ R-9621 is an aliphatic polyester waterborne urethane. Another non-limiting example of a suitable water based polyurethane is Bondthane™ UD-104 produced by Bond Polymers International. Yet another non-limiting example of a suitable water based polyurethane dispersion is Unithane SX-487SF supplied Union Specialties. In the compositions of the present subject matter, Unithane may be used either alone or blended with other polyurethanes.

The compositions of the present subject matter optionally comprise one or more water soluble polyesters. In many embodiments, this component is in the form of a water dispersible, linear polyester prepared from the polycondensation of glycols and dicarboxylic acids, at least some of which contain functional groups such as but not limited to, sulfonate salts ($-SO_3M$), carboxyl groups ($-COOH$), and combinations thereof. Typical molecular weights for the polyester range from about 5,000 to about 20,000 with 10,000 to 14,000 being useful for many applications. Typical glass transition (Tg) temperatures range from about 36° C. to about 52° C. with 42° C. to 46° C. being useful for certain embodiments. A nonlimiting example of a suitable water polyester is SKYBON EW 100Q available from SK Chemicals.

The present subject matter compositions also comprise one or more silica component(s). Typically, the silica component is in the form of amorphous silica having an average particular size of from about 4 µm to about 6 µm, and for particular embodiments from 4.3 µm to 5.3 µm. A nonlimiting example of a suitable silica component is SYLOBLOC® 45 available from Grace Davison Engineered Materials.

The present subject matter compositions also comprise one or more crosslinkers or crosslinking agents that serve to crosslink or at least promote crosslinking of the polyurethane component(s). A particularly useful crosslinker is an aziridine, or carbodiimide crosslinker. A nonlimiting example of an aziridine crosslinker is CX-100 available from DSM NeoResins. CX-100 is a polyfunctional aziridine liquid crosslinker.

The present subject matter compositions can include additional components. For example, when formulating a top coat composition to be used with an acrylate-containing ink, it may be beneficial to include one or more acrylic polymers in the top coat composition. Typical concentrations of the acrylic polymers in the top coat composition may range from about 0% to about 85%. A nonlimiting example of a suitable acrylic polymer is a 100% acrylic emulsion polymer available under the designation NeoCryl® FL-791 XP from DSM NeoResins. The present subject matter compositions may also comprise one or more antiblock agents. When forming top coats on polymeric films with polymeric release liners, incorporation of antiblock agents may be beneficial. The present subject matter compositions may also comprise one or more defoamers. A nonlimiting example of a suitable defoamer is Dehydran® 1620 defoamer produced by BASF.

Additional processing can be performed upon either the surface to receive the top coat formulation, or upon the top coat layer, or both. For example, corona treatment may be performed upon the surface to receive the top coat, prior to applying the top coat. Alternatively or in addition, corona treatment may be performed upon a previously applied and formed top coat.

Useful top coat compositions can be prepared by addition of water to the noted components. It will be understood that certain components may include water such as for example the polyurethane dispersion(s) and the polyester. Thus, the water associated with those components may be sufficient to achieve a desired water content for the resulting composition. Alternatively, additional amounts of water are added to produce an aqueous top coat composition with properties and/or characteristics as desired.

Table 2 lists representative and particular top coat compositions A and B in accordance with the present subject matter. The percentages in Table 2 are weight percentages based upon the total weight (including water) of the resulting top coat composition.

TABLE 2

Top Coat Compositions A and B

| Ingredient | Top Coat A Quantity (%) | Top Coat B Quantity (%) |
| --- | --- | --- |
| Bayhydrol UH XP 2719 | 22.50 | 37.50 |
| Sylobloc 45 | 0.33 | 0.33 |
| CX-100 | 0.50 | 0.15 |
| Water | 0.90 | 35.70 |
| Neorez R-9621 | 15.77 | 26.32 |
| EW 100Q Solution (25%) | 60.00 | — |
| Total | 100.00 | 100.00 |

The compositions such as top coat compositions can be applied to a surface or substrate using a wide array of techniques and methods. When applying as a top coat to a polymeric film, conventional application techniques can be used. Representative coat weights for top coats in accordance with the present subject matter range from about 0.1 to about 1.0 grams per square meter (gsm), and in particular embodiments from 0.5 gsm to 0.6 gsm.

Typically, after application to a surface of interest such as a polymeric film, the resulting coating is dried and allowed to sufficiently cure, i.e., crosslink. As will be appreciated, the time period for drying depends upon several factors including the drying temperature and the amount of water and/or other vehicles or solvent present in the coated composition. The present subject matter includes drying at ambient temperatures or drying at elevated temperatures such as by heating. An advantage of using an aziridine crosslinking agent is that typically crosslinking can occur at ambient temperatures and thus heat is not necessary to effect curing. Typically, top coats are suitably dried and/or cured after a time period of about 12 hours or more, in certain embodiments after a time period of 24 hours or more, in other embodiments after a time period of 48 hours or more, in still other embodiments after a time period of 72 hours or more.

After application, drying, and crosslinking of the top coats in accordance with the present subject matter, a durable, print-receptive surface is formed. The resulting top coats can receive print, inks, or other similar compositions and promote bonding and/or adherence of the print, ink, or like composition to the underlying top coat.

The top coat compositions of the present subject matter are particularly adapted for receiving print or other indicia which is applied by thermal transfer means, such as for example by thermal transfer ribbons carrying waxy resins as known in the art. The top coat compositions are also well suited for receiving UV curable flexo inks or water based flexo inks as known in the art. In certain embodiments and/or applications, top coats of the present subject matter can be used in conjunction with all of these printing techniques and/or inks.

The top coat compositions of the present subject matter exhibit good resistance to scratches, nicking, and scuffing. The top coat compositions of the present subject matter also exhibit good resistance to solvents and environmental factors.

Additional aspects and details of top coat compositions, components thereof, and processing and application thereof are described in WO 02/062894, herein incorporated by reference. For example, in certain embodiments top coats of the present subject matter may include one or more of the components described in the WO '894 publication.

EXAMPLES

A series of investigations were undertaken to evaluate (i) scratch resistance, (ii) ink adhesion, and (iii) solvent resistance of a top coat composition in accordance with the present subject matter as compared to several other top coats.

Specifically, four (4) top coat formulations were obtained or prepared. Top coat C was a top coat formulation from Supplier A. Top coat D was a top coat formulation from Supplier B. Top coat E was a top coat formulation in accordance with the present subject matter. And, top coat F was a top coat formulation available from Avery Dennison.

Each top coat formulation was applied to a substrate. Printing by thermal transfer, or printing using UV curable flexo ink or water-based flexo ink (at either 100 feet per minute (fpm) or 300 fpm) was performed upon the top coats, as described herein. Several top coated samples also received corona treatment.

After preparation, i.e., coating, drying, and curing, of the top coated samples, and deposition of print thereon, the samples were subjected to scratch resistance testing, ink adhesion evaluation, and solvent resistance testing.

Particular types of scratch resistance and ink adhesion evaluations were performed depending upon whether print was applied by thermal transfer or using flexo inks.

For samples that received printing by thermal transfer ribbons (ribbons DNP R-510HF and ITW B324), each printed sample was subjected to fifty (50) rubs applied using a Crocker meter as known in the art. The samples were then read by a Trucheck Verifier as known in the art to obtain an ANSI (American National Standard Institute) number. That number provides an indication as to the extent of ink that was removed as a result of the Crocker meter. A higher number corresponds to a higher resistance to scratching.

For samples that received printing by application of UV curable flexo ink or water-based flexo ink, a "cross hatch" test and a "nickel scratch" test were used. The cross hatch test involves subjecting the printed ink face of the samples to a series of scratches applied in a cross hatch fashion, and then applying an adhesive tape onto the scratched face. The tape is then removed and if sufficiently scratched, regions of printed ink dislodged from the top coat become adhered to the tape and are removed from the sample upon tape removal. The tape used is 810 Tape available from 3M. A subjective rating was then assigned to the sample after tape removal in which a high score designated a high degree of print or ink adhesion, i.e., low amount of ink retained on the tape after removal.

The nickel scratch test involves subjecting the printed ink face of the samples to scratching from a nickel coin rubbed across the printed face of the sample. The scratching resulting from the nickel scratch test is harsher than that resulting from the cross hatch test. A subjective rating was then assigned to the sample after scratching. A high score designated a high degree of print or ink adhesion, i.e., low degree of scratching resulting from the nickel.

Table 3A summarizes the results of scratch resistance and ink adhesion for samples printed by thermal transfer ribbons.

TABLE 3A

Performance of Top Coats with Thermal Transfer Printing

|  | Top Coat | | | |
|---|---|---|---|---|
| Printing | C | D | E | F |
| Thermal Transfer | 10 | 3 | 9 | 2 |

The values in Table 3A are the average results from the Crocker meter analysis. Higher values are better. Top coat E in accordance with the present subject matter exhibited excellent performance.

Table 3B summarizes the results of scratch resistance and ink adhesion for samples printed using UV curable flexo inks. Table 3B presents values which are the sum of the scores of the previously described cross hatch test and nickel scratch test. Table 3B presents the sum of scores for samples that were not corona treated. The printing experiment was done at 100 fpm and 300 fpm at 2 Billion Cubic Microns (BCM).

TABLE 3B

Performance of Top Coats and Flexo Inks, Without Corona Treatment

|  | Top Coat | | | |
|---|---|---|---|---|
| Printing | C | D | E | F |
| UV Flexo | 15 | 14 | 14 | 6 |
| Substrate | BOPP | BOPP | BOPP | BOPP |

As evident from the testing results summarized in Table 3B, the overall performance of a top coat in accordance with the present subject matter, i.e., Top coat E, exhibited the same relatively good performance for UV flexo inks as compared to the top coats from Supplier A and Supplier B, i.e., Top coats C and D.

Solvent resistance was evaluated by preparing samples of the present subject matter top coated on white PET film. Similar samples using top coat formulations from Supplier A and Supplier B were prepared. The top coated samples received print by thermal transfer using a DNP R-510HF ribbon, and also by an ITW B324 ribbon.

Solvent resistance was assessed by using a numerical rating system in which a low score indicates a relatively high degree of removal or dissolving of top coat material after exposure to solvent(s); and a high score indicates good resistance to the solvent(s). For solvent resistance evaluation, top coated samples were thermal transfer printed, aged for 24 hours, and then soaked in a solvent bath for 1 hour. The solvent bath was a 50/50 mixture of toluene and kerosene. After removal from the bath, the printed or ink coated samples were then thumb rubbed an equal number of times. This solvent resistance evaluation is generally in accordance with the procedure described in standard UL 969.

Comparison of the various samples after soaking in solvent followed by finger rubbing indicated that the samples that were top coated in accordance with the present subject matter exhibited comparable performance as samples having other commercially available top coats.

To further improve the UV flexo printing performance, Top coat E was modified to G, H, and J. The formulations were prepared and top coated on polyester film using the Meyer rod technique.

TABLE 4

Top Coat Compositions E, G, H, and J

| Ingredient | Top Coat E Qty (%) | Top Coat G Qty (%) | Top Coat H Qty (%) | Top Coat J Qty (%) |
|---|---|---|---|---|
| Bayhydrol UH XP 2719 | 29.5 | 31.4 | 6.3 | 0 |
| Unithane SX-487SF | 0 | 0 | 0 | 14.34 |
| Sylobloc 45 | 0.43 | 0.5 | 0.5 | 0.46 |

TABLE 4-continued

Top Coat Compositions E, G, H, and J

| Ingredient | Top Coat E Qty (%) | Top Coat G Qty (%) | Top Coat H Qty (%) | Top Coat J Qty (%) |
|---|---|---|---|---|
| Dehydran 1620 | 0.01 | 0 | 0 | 0 |
| CX-100 | 0.65 | 0.3 | 0.3 | 0.3 |
| Water | 29.01 | 10.9 | 16.2 | 14.71 |
| Neorez R-9621 | 20.66 | 22 | 0 | 0 |
| Bondthane UD-104 | 0 | 0 | 6.6 | 0 |
| EW 100Q solution (25%) | 19.64 | 0 | 0 | 0 |
| EW 100Q solution (15%) | 0 | 34.8 | 34.8 | 34.85 |
| Ammonia 19% | 0.1 | 0.1 | 0 | 0 |
| Neocryl FL-791 XP | 0 | 0 | 35.3 | 35.34 |
| Total | 100 | 100 | 100 | 100 |

The results are summarized in Table 4A below. The printing was performed using a lab unit (Flexi UV printer) printing at 150 fpm at 3 BCM.

TABLE 4A

Performance of Top Coats and UV Flexo Inks, Without Corona Treatment

| Printing | Top Coat | | | | |
|---|---|---|---|---|---|
| | C | E | G | H | J |
| UV Flexo | 10 | 8 | 10 | 10 | 10 |

The results are based on "Cross Hatch Adhesion Test" using A10 tape-higher values are better. The performance of G, H, and J formulations was equivalent to that of formulation C. Top coat G and H also have good solvent resistance based on UL 969 test when DNP R-510HF ribbon is used in thermal transfer printing. Additionally, Top coat H has good laser printing quality.

Many other benefits will no doubt become apparent from future application and development of this technology.

All patents, published applications, standards, and articles noted herein are hereby incorporated by reference in their entirety.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. An aqueous top coat composition comprising:
   10 to 85 parts by weight of one or more polyurethanes;
   10 to 60 parts by weight of one or more water soluble polyesters;
   0 to 80 parts by weight of one or more acrylic polymers;
   0.01 to 3 parts by weight of silica;
   0.05 to 3 parts by weight crosslinker;
   wherein the aqueous top coat composition comprises from 20 to 99.04% solids.

2. The top coat composition of claim 1, wherein the polyurethanes include a hard polyurethane and a soft polyurethane.

3. The top coat composition of claim 1, wherein the water soluble polyester is a linear polyester prepared from the polycondensation of glycols and dicarboxylic acids and has a molecular weight from 5,000 to 20,000.

4. The top coat composition of claim 3, wherein the polyester has a glass transition temperature Tg from 36° C. to 52° C.

5. The top coat composition of claim 1, wherein the crosslinker includes an aziridine crosslinker.

6. The top coat composition of claim 1, wherein the composition comprises from 10 to 70 parts by weight of one or more acrylic polymers.

7. The top coat composition of claim 1, further comprising at least one additional component selected from the group consisting of an antiblock agent, an acrylic polymer, and combinations thereof.

8. The top coat composition of claim 1, further comprising water in addition to water found with any of the other components of the top coat composition.

9. A top coated substrate comprising:
   a polymeric substrate;
   a top coat disposed on the substrate, the top coat including 10 to 85 parts by weight of one or more polyurethanes, 0 to 80 parts by weight of one or more acrylic polymers, 10 to 60 parts by weight of one or more water soluble polyesters, 0.01 to 3 parts by weight of silica, and 0.05 to 3 parts by weight crosslinkers;
   wherein the top coat is print receptive.

10. The top coated substrate of claim 9, wherein the substrate is bi-axially oriented polypropylene (BOPP).

11. The top coated substrate of claim 9, wherein the substrate is machine direction orientation (MDO) film.

12. The top coated substrate of claim 9, wherein the substrate is polyester film.

13. The top coated substrate of claim 9, wherein the polyurethanes include a hard polyurethane and a soft polyurethane.

14. The top coated substrate of claim 9, wherein the water soluble polyester is a linear polyester prepared from the polycondensation of glycols and dicarboxylic acids and has a molecular weight from 5,000 to 20,000.

15. The top coated substrate of claim 9, wherein the polyester has a glass transition temperature Tg from 36° C. to 52° C.

16. The top coated substrate of claim 9, wherein the crosslinker includes an aziridine crosslinker.

17. The top coated substrate of claim 9, wherein the composition comprises from 12 to 27 parts by weight of polyurethanes.

18. The top coated substrate of claim 9, wherein the composition comprises from 15 to 25 parts by weight of water soluble polyesters.

19. The top coated substrate of claim 9, wherein the composition comprises from 0.01 to 2 parts by weight silica.

20. The top coated substrate of claim 9, wherein the composition comprises from 0.05 to 1 parts by weight crosslinker.

* * * * *